United States Patent
Moeller

(10) Patent No.: US 7,455,608 B2
(45) Date of Patent: Nov. 25, 2008

(54) FOUR BRANCH DIFFERENTIAL TRANSMISSION SYSTEMS

(75) Inventor: Frank Moeller, Stafford (GB)

(73) Assignee: Drivetec (UK) Limited, London (GB)

( * ) Notice: Subject to any disclaimer, the term of this patent is extended or adjusted under 35 U.S.C. 154(b) by 331 days.

(21) Appl. No.: 10/551,187

(22) PCT Filed: Mar. 23, 2004

(86) PCT No.: PCT/GB2004/001235

§ 371 (c)(1),
(2), (4) Date: Jul. 18, 2006

(87) PCT Pub. No.: WO2004/088168

PCT Pub. Date: Oct. 14, 2004

(65) Prior Publication Data

US 2006/0264296 A1    Nov. 23, 2006

(30) Foreign Application Priority Data

Mar. 29, 2003    (DE)    ................ 103 14 234

(51) Int. Cl.
*F16H 3/72*    (2006.01)
(52) U.S. Cl. ......................................................... 475/5
(58) Field of Classification Search .................... 475/5; 180/65.6
See application file for complete search history.

(56) References Cited

U.S. PATENT DOCUMENTS

| | | | |
|---|---|---|---|
| 5,558,589 A | 9/1996 | Schmidt | |
| 7,004,868 B2 * | 2/2006 | Oshidari et al. | 475/5 |
| 7,169,073 B2 * | 1/2007 | Schmidt et al. | 475/5 |
| 7,172,524 B2 * | 2/2007 | Moeller | 475/5 |
| 7,204,776 B2 * | 4/2007 | Minagawa et al. | 475/5 |
| 7,214,154 B2 * | 5/2007 | Klemen et al. | 475/5 |
| 7,393,296 B2 * | 7/2008 | Kano et al. | 475/5 |

FOREIGN PATENT DOCUMENTS

| | | |
|---|---|---|
| EP | 1 279 545 | 1/2003 |
| EP | 1 281 559 | 2/2003 |
| GB | 2 363 173 | 12/2001 |

\* cited by examiner

*Primary Examiner*—Dirk Wright
(74) *Attorney, Agent, or Firm*—Finnegan, Henderson, Farabow, Garrett & Dunner, L.L.P.

(57) ABSTRACT

The four branch differential Transmission System, ("FBD"), comprises a first input shaft and a second output shaft. Furthermore there are third and fourth shafts which are respectively connected to first and second variators which control the speed (or torque) of the shaft, to which they are connected. Each variator can, for instance, be an electric motor which can adjust the speed of these shafts. The four shafts (branches) of the FBD are connected directly or indirectly via gears. The FBD comprises spur gear planetary gearsets. There is no requirement for a ring gear. The FBD includes two planetary gearsets using several spur gear suns and planets, which form a combination of a plus planetary gearset and a minus planetary gearset.

9 Claims, 3 Drawing Sheets

FOUR BRANCH DIFFERENTIAL TRANSMISSION SYSTEMS

CROSS REFERENCE TO RELATED APPLICATIONS

This application is a national phase application based on PCT/GB2004/001235, filed Mar. 23, 2004, the content of which is incorporated herein by reference and claims the priority of German Application No. 10314234.7, filed Mar. 29, 2003, under 35 U.S.C. § 119.

BACKGROUND

1. Technical Field

The present invention relates to a four branch differential transmission system ("FBD") for use in so-called power split transmissions ("PST"), particularly for use in vehicles. Such transmissions transmit mechanical power through two parallel paths and their speed ratio may be varied in a stepless and controlled manner.

2. Description of Related Art

Conventional three branch differential transmission systems include a planetary gear train, in which a sun gear is connected to a central shaft and is positioned concentrically within an internally toothed ring gear. A number of planet gears are situated between and mesh with the sun and the ring gears. The planet gears are held on bearings on a carrier, which is rotatably mounted concentrically on the central shaft. With this typical arrangement it is possible for the sun and ring gears to rotate around the central axis. The planets are free to rotate on their own axes and are held in their relative positions by means of the carrier and are therefore able to orbit the central axis. Generally, two of the sun gear, ring gear and the carrier are connected to an input and an output shaft. This leaves one of the three unconnected. If this free branch is rotated by an additional controlled drive, the ratio of input speed to output speed can be adjusted.

This method of changing transmission ratios makes planetary gear trains especially attractive for vehicle transmissions, as automatic transmissions can be simply constructed. By coupling two planetary gear trains, an FBD can be created, whereby, with the use of two variable speed drives connected to the two branches which are not connected to the input or output, the overall transmission ratio can be adjusted over a very high speed range. U.S. Pat. No. 5,558,589 shows the practical application of such a transmission which uses several regimes for an agricultural vehicle. Two planetary gear trains are arranged in parallel to form the FBD, whereby the carrier of one gear train is connected to the ring gear of the other. The two variable speed drives constitute electric motors. Adjustment in speed of one electric motor is sufficient to change the transmission ratio of the FBD. To reach the required range of output speeds however, several transmission regimes are required, which are achieved by engagement and disengagement of several clutches.

WO94/08156 and WO94/10483 describe several multi-regime PST, which used FBD (Ravigneaux gear train). Again several double clutches and additional gearbox components are required to change regime.

GB 2363173 A shows an electrical single regime PST for automotive vehicles, whereby the two planetary trains are placed side by side. The trains are connected via the suns, which are mounted on a common shaft, and by the carrier of the first gear train being connected to the ring gear of the second. The drive input is from a flywheel, which is connected to the carrier of the first gear train, and the output is via the carrier of the second train. This arrangement has a good efficiency, as the motors are designed in such a way that one motor uses electrical energy, which is generated by the other. To a large extent, electrical energy losses can therefore be avoided.

The planetary gear trains of known FBD generally consist of two co-called "minus gearsets", situated side by side. A minus epicyclic gearset is one which incorporates three gear elements and in which rotation of the sun gear in one direction results in rotation of the gear element with which the planet gears are in mesh in the opposite direction whilst the carrier is held stationary. In a positive gearset, the sun gear and the gear element with which the planet gears are in mesh rotate in the same direction when the carrier is held stationary. Known FBD generally comprise two ring gears, which are expensive to manufacture, especially if high precision is required, as is the case for most of these gear trains. Furthermore, it is difficult to achieve basic Ro ratios (number of teeth on the ring gear divided by the number of teeth on the sun gear) of less than −2.00 (minus gear train), as the planet gears become too small. For many applications, however, a low Ro is desirable.

EP 1279545 A2 again describes an application of a so-called Ravigneaux planetary gearset. This is a combination of a plus and a minus gear train, whereby the assembly requires only one ring gear. However, the problem of not being able to achieve Ro ratios greater than +2.00 and less than −2.00 still exists.

The object of the invention is to provide an FBD which reduces the number of costly parts and which achieves Ro ratios of less than +/−2.00.

SUMMARY

According to the invention this object is solved by the features of claim 1.

The FBD according to the invention comprises a first input shaft and a second output shaft. Furthermore there are third and fourth shafts which are respectively connected to first and second variators which control the speed (or torque) of the shaft, to which they are connected. Each variator can, for instance, be an electric motor which can adjust the speed of these shafts. The four shafts (branches) of the FBD are connected directly or indirectly via gears. According to the invention the FBD comprises spur gear planetary gearsets. There is no requirement for a ring gear. According to the invention, the FBD includes two planetary gearsets using several spur gear suns and planets, which form a combination of a plus planetary gearset and a minus planetary gearset.

Each of the two planetary gearsets comprise two sun gears and two sets of planets, whereby one sun wheel and set of planets is common to the two gearsets and the two gearsets are connected via a common planet carrier, which can either be two connected carriers or be a single integral unit.

In the preferred embodiment, the set of third planet wheels is in mesh with a set of fourth planet wheels mounted to rotate about respective planet shafts connected to the common carrier, each fourth planet wheel being in mesh with a respective third planet wheel, whereby the third sun wheel is in indirect mesh with the third planet wheels and rotates in the same direction as the third planet wheels.

The FBD according to the invention does not require any internally toothed ring gear. This has the advantage that the diameter of the transmission is smaller so that, for instance, in a preferred application in automotive vehicles, conventional transmissions can be readily replaced. In practice, all the spur gears will be externally toothed and an advantage of this is the lower cost, due to the avoidance of expensive ring gears. Additionally, Ro ratios of less than 2.00 can be reached easily, without making the planet gears too small to be manufactured or to bear the anticipated loading.

Any of the four shafts may basically be connected to the input or output shafts. In one preferred embodiment the common planet carrier is connected to either the input or the output shaft, which means that the common carrier can also be the input or output shaft. If, for example, the carrier is of cup or generally cylindrical shape, its outer perimeter can form or carry a gear or sprocket, which enables the lateral take off or input of power. A cup shape, partially or fully enclosing the two gearsets, is generally preferable, as it can reduce the space requirement of the FBD.

In a further preferred embodiment, the input or output shaft is rigidly connected to, or integral with, the third sun. This coaxial relationship makes through drive possible. The variators may take various forms but it is preferred that the variators comprise electric motor/generators, preferably arranged coaxially.

The overall transmission ratio of the FBD is influenced by the two variators which are connected to the first and second planetary gearsets, respectively, to adjust the output speed and/or output torque.

The variators may be of any type, such as reversible pneumatic or hydraulic machines, but it is preferred that they are reversible electrical machines, i.e. motor/generators, preferably of permanent magnet or variable reluctance type.

In a preferred embodiment, the stator connections of the two motor/generators are connected together via one or more controllers which may be selectively operated to vary the electrical power transmitted between the two motor/generators and thus to vary the transmission ratio of the transmission system. The variators may be interconnected by means of electric cables or a bus bar, if they are electric, or pneumatic/hydraulic tubing, if they are of a pneumatic or hydraulic type, enabling the transmission of electrical or fluid power between them. Each variator may have its own control unit, which controls current or fluid flow and thus the output torque and/or speed of the transmission.

One of the four shafts (branches) of the FBD can be connected to the common planet carrier, one to the common sun gear and one each to the other sun gears, whereby the other ends of these shafts are connected according to application, ratio and range requirements, to either the input shaft, the output shaft and the variators.

In addition to the first and second planetary gearsets, the FBD can also be connected to further gearsets to provide further speed reduction or speed increase ratios. These additional gearsets can either be conventional fixed gearsets or planetary gearsets.

The additional gearsets can also include an FBD according to the invention and they can either be arranged in parallel or in series and can have different basic ratios. Thus, very wide output ranges can be achieved to suit any application.

In the FBD according to the invention, the total transmission size is sufficiently small to permit it to be substituted for conventional transmissions, without there being any requirement to modify the vehicle or prime mover.

The FBD according to the invention is not just suitable for main transmissions of all types, but can be applied wherever stepless control of output speed is desirable. As such it is suitable for driving generators, pumps and compressors and can serve as an auxiliary drive for cooling pumps, fans, superchargers, charging alternators and air-conditioners. Furthermore it can be applied to all types of transport, such as automotive vehicles, tractors, railway locomotives, aircraft, boats and ships, motor cycles, military vehicles etc. Their application also extends to stationary plant, earth-moving machines and agricultural machinery.

BRIEF DESCRIPTION OF THE DRAWINGS

Further features and details of the invention will be apparent from the following description of two exemplary embodiments of FBD, which are particularly suitable for automotive use, which is given by way of example with reference to the accompanying drawings, in which.

DETAILED DESCRIPTION

Figure 1:
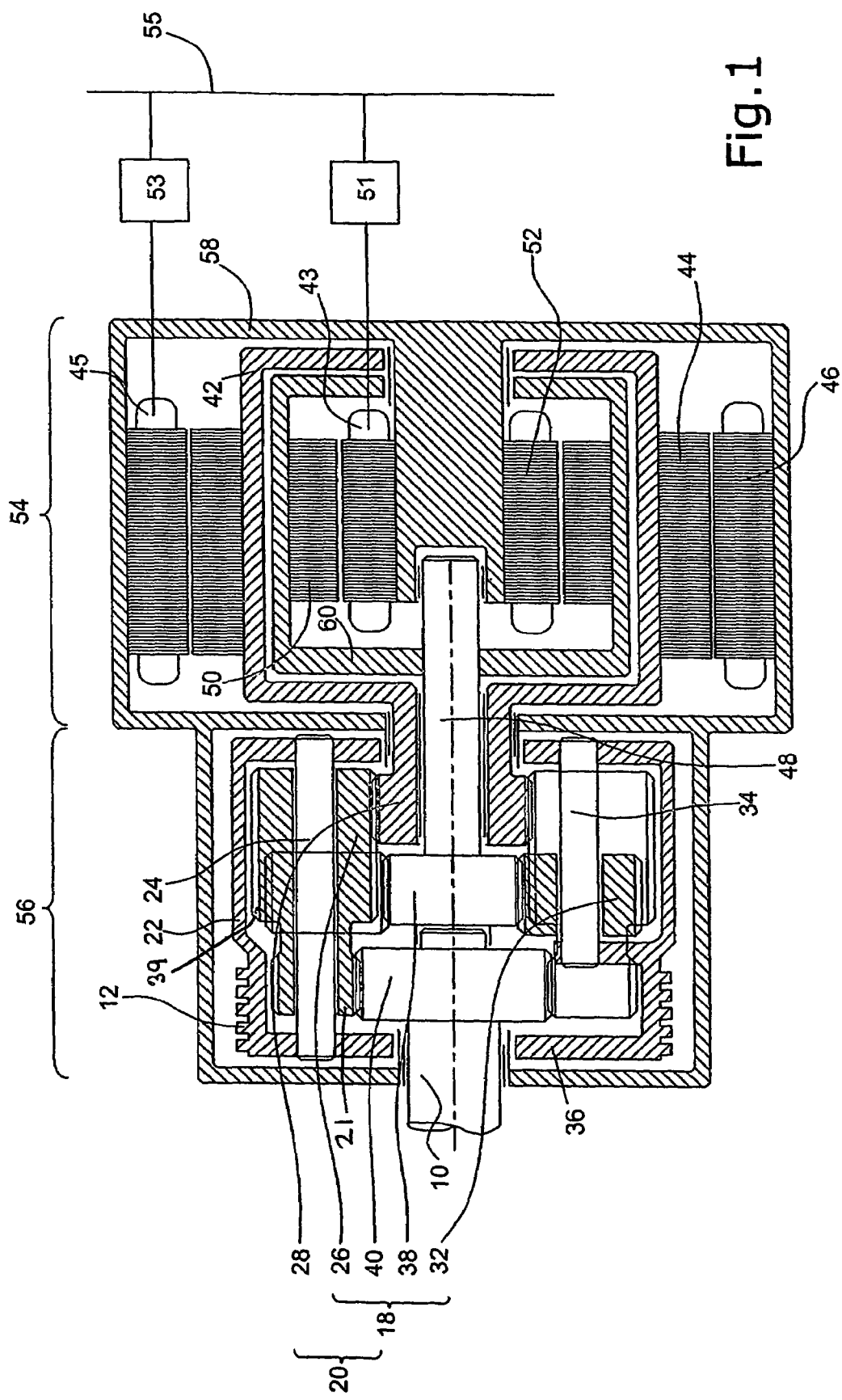
FIG. 1 is a schematic sectional view of a first preferred embodiment with a lateral drive output.

The FBD shown in FIG. 1 has an input shaft (first branch) 10 and an output shaft (second branch) 12, constituted by a common planet carrier 22. It is basically possible to swap the input and output and this results in the same node point ratio, (which will be discussed below), but in different branch speed ratios. In this example, the input shaft is connected to an engine flywheel. It has a lateral drive output, as is common with front wheel drive automotive vehicles, but the carrier 22 can also form the output member, in the form of a gear or sprocket, which takes the drive to a laterally positioned parallel shaft.

The FBD also includes a so-called minus planetary gearset 18 and a second so-called plus gearset 20. Both gearsets have no ring gear and are made up of straight or helical spur gears only, resulting in a very compact construction.

The minus gearset 18 comprises a sun wheel 40, which is carried by the input shaft 10 and is in mesh with a set of planet wheels 21. Each planet wheel 21 is rotatably carried by a respective planet shaft 24 which is integral with a further respective planet wheel 39, which is of different diameter and is also rotatably carried by the same planet shaft 21. Each planet wheel 39 is in mesh with a respective planet wheel 32, which is rotatably carried by a respective planet shaft 34 and is in mesh with a sun wheel 38 carried by a shaft 48. The planet shafts 24 and 34 are carried by a common cup-shaped carrier 22 which encloses the minus and plus gearsets and constitutes the output shaft at a portion 12. The carrier 22 includes an annular flange 36 whose free end is supported on the input shaft 10.

The plus gearset also includes the sun wheel 40 and planet wheels 21. The planet wheels 21 are also integral with a further respective planet wheel 26, which is thus integral with a respective planet wheel 21. The planet wheels 21 and 26 are in this case of the same diameter and thus effectively constitute single planet wheels, but they could also be of different diameter. The planet wheels 26 are in mesh with a sun wheel 28.

The sun wheel 28 is connected to a shaft 42 which is connected to the rotor 52 of an electrical motor/generator, the stator 46 of which is connected to the outer casing 58. The shaft 48 is connected to a shaft 60 which is connected to the rotor 50 of a further motor/generator, the stator 52 of which is also connected to the outer casing 58.

The electrical connections 45, 43 of the two stators 46, 52 are connected together via a bus bar 55 and respective control units 51 and 53 so that they can exchange electrical power.

The bus bar can also be connected to an electric storage battery directly or via a further control unit and/or an inverter/transformer.

As can be seen in FIG. 1, the rotors 44, 50 and stators 46, 52 are integrated as a unit 54. The first planetary gearset 18 and the second planetary gearset 20 are also integrated as a unit 56. The housing 58 consists of two separate compartments, which accommodate these units. The interconnection of these units 54, 56 is via the input shaft 10, the third shaft 42 and the fourth shaft 48, which all can have a relatively small diameter, so that they can carry radial shaft seals, thereby creating an oil tight seal between the two compartments. Thus it is possible to create an oil-free environment within unit 54, avoiding unnecessary oil churning losses.

FIG. 1 shows how the motors/generators can be placed coaxially inside each other, to save space. In this case, the rotor of the inner motor is an external rotor and the rotor of the outer motor is an internal rotor. Since both motors mostly run in the same direction, in use, their air turbulence losses can thus be minimised.

Some elements in the simplified illustration of FIG. 1, which are necessary for the actual operation of the FBD, for instance proper bearings and seals, are not generally shown. This also applies also to the split lines and fasteners required for mounting the elements and assembling the FBD.

The dimensions of the planets and suns are not to scale. The actual dimensions depend on the torque to be transmitted and the required ratios, which also determine the node point ratio.

In use, one of the motor/generators generally acts as a generator and transmits electrical power to the other motor/generator, which acts as a motor. The amount of electrical power so transmitted may be varied by means of the controllers 51, 53, thereby altering the transmission ratio of the FBD. Power is thus transmitted through the FBD both mechanically and electrically, in proportions which vary with varying transmission ratio, which is why the FBD in accordance with the invention is also referred to as a power split transmission. There are in general two transmission ratios at which the electrical power transmitted between the two motor/generators is zero and these are referred to as node points. The ratio of the transmission ratios at these two node points is referred to as the node point ratio.

Figure 2:
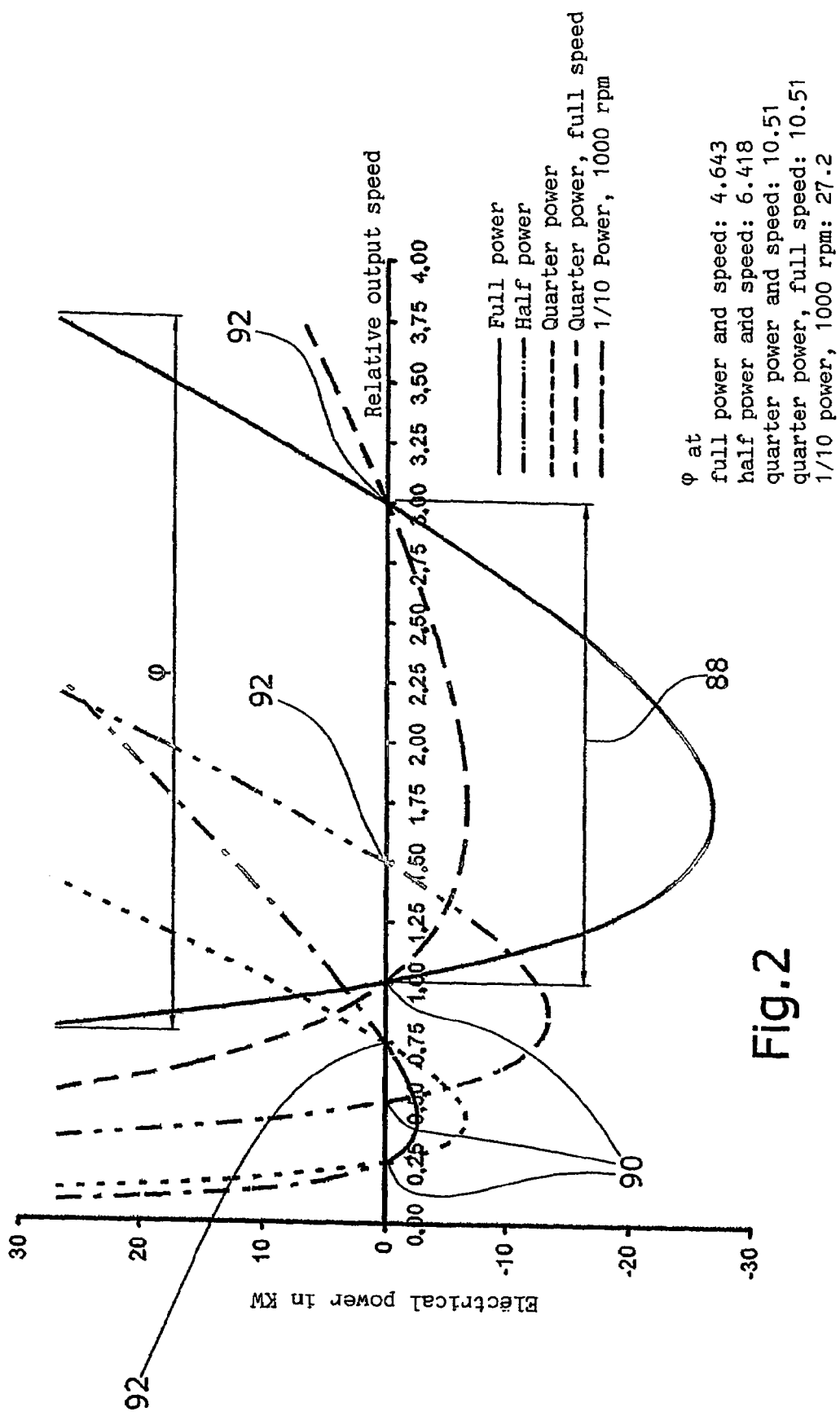
FIG. 2 is a diagram of the required electrical power over the forward drive range at a node point ratio of 3.00.

The diagram in FIG. 2 shows the power flow in the variators plotted against relative output speed, i.e. between the two motor/generators 44, 46, 50, 52 which in this case is an electric power flow. This diagram applies to an FBD having a power throughput of 100 kW and a node point ratio 88 of three, whereby it is possible to have a multitude of combinations, which all have four free shafts (branches) 10, 12, 42, 48. Two of the shafts 10, 12, 42, 48 are the input 10 and output 12 and the other two shafts 42, 48 are connected to the motor/generators 44, 46; 50, 52. The motors are able to operate in all four mathematical quadrants. This means they are fully reversible and are able to run as motor and generator. In the diagram, friction-free and non-hybrid operation was assumed, so that at the node points 90, 92, where one of the motor/generators comes to a complete standstill, the variator power becomes zero. Outside these node points 90, 92, one of the motors 44, 46; 50, 52 always operates as a motor and the other as a generator, and there is no external electric power flow. Under ideal conditions, therefore, the mathematical sum of the two motor/generator powers is always zero and the power flow between the motors 44, 46; 50, 52 is given in the graph. If additional electrical power is required, this may be supplied by the electric battery, which is optionally provided.

In this event, the associated controller may be operated to recharge the battery at those times when excess power is available.

When using the total output speed range, all these transmissions have two node points 90, 92, which are both positive if the FBD is correctly designed, in this case at the relative output speeds of one and three, resulting in a node point ratio of three. This ratio is the most important characteristic of the FBD. It determines the total range of output speeds (expressed as a multiple) $\phi$ at full load and results in this example in a maximum variator power of 27% of the power throughput. Larger node point ratios 88 result in higher variator powers. The upper and the lower $\phi$ points 90, 92 are chosen in such a way that the maximum negative and positive powers transmitted between the variators are equal so that the motors 44, 46; 50, 52 can be designed for these power maxima.

Below the lower node point 90, the throughput power requirements are generally lower, whereby theoretically this power becomes zero, when the vehicle is stationary, even at full output torque. This reduction of power can be used to take the spread of speeds or the $\phi$ ratio to virtual infinity. The graph shows the partial load curves at half, quarter and a tenth of the nominal power throughput. Additionally, the curves are shifted, when the input speed changes. At lower powers, therefore, it is possible to reverse, without changing gears or using any clutches or couplings, without exceeding the nominal variator power.

Figure 3:
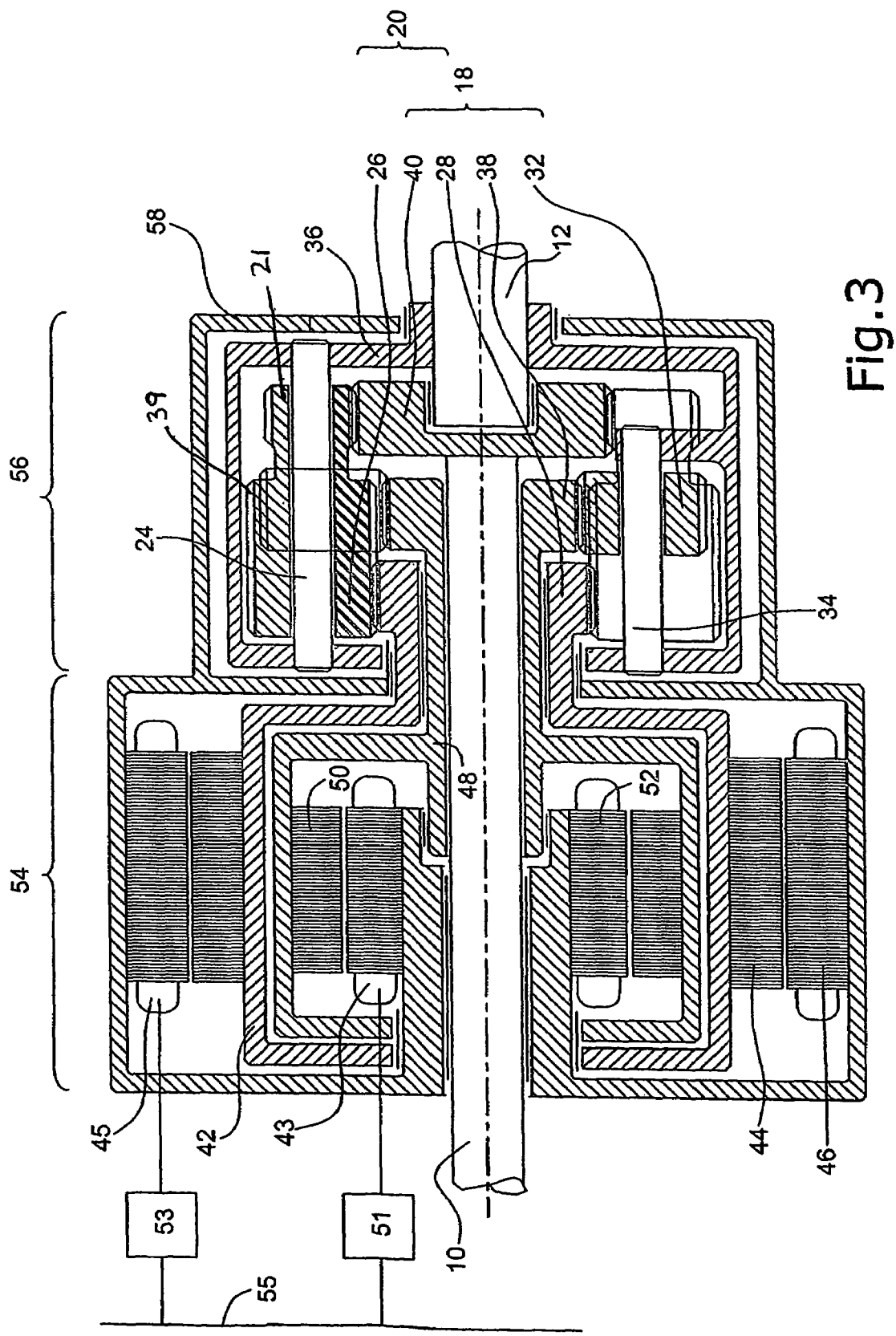
FIG. 3 is a schematic sectional view of a second preferred embodiment with a concentric output.

FIG. 3 shows an arrangement similar in principle to FIG. 1, but in this case the output shaft is concentric with, and on the opposite side of, the input shaft, as is normally the case for transmissions for rear wheel drive vehicles. Furthermore, with this design it would be possible to arrange an FBD on either end of an internal combustion engine or any other prime mover and to control the output speed and/or torque of the two outputs completely independently. This enables the realisation of All Wheel Drive vehicles with an FBD and final drive for each wheel, whereby the drive shafts can directly connect the FBD and the wheels. Conventional axle differentials can then be dispensed with.

In contrast to FIG. 1, FIG. 3 shows the concentrically mounted input shaft 10, supported in housing 58, being very much longer and the motor compartment 54 has been moved towards the input side. For drive systems driven by a combustion engine, this has a further advantage, namely that the dry flywheel housing is situated beside the normally dry motor space and no oil seal is required here. The oil lubricated gear housing can then be integrated with a final drive reduction gear train, both of which can form a single sealed unit.

The invention claimed is:

1. A four branch differential transmission system comprising:
   a first shaft and a second shaft, which constitute the input and output shafts;
   a third shaft connected to a first variator arranged to increase or decrease its speed and;
   a fourth shaft connected to a second variator arranged to increase or decrease its speed;
   the four shafts being connected together by a spur gear compound epicyclic gearset including a plurality of toothed gearwheels,
   wherein the compound epicyclic gearset comprises first and second epicyclic gearsets, the first epicyclic gearset being of positive type and comprising a first sun wheel and a second sun wheel in mesh with a respective set of first and second planet wheels, each first planet wheel being connected to rotate with a respective second planet wheel about a respective common planet shaft, the planet shafts being connected to a common planet carrier, the second epicyclic gearset being of negative type and comprising the first sun wheel and a third sun wheel, the third sun wheel being in mesh with a set of third planet wheels, each of which is connected to rotate with a respective first and second planet wheel about a respective planet shaft, the first and third planet wheels or the first and second planet wheels of each connected set of planet wheels being of different diameter and being connected together to constitute a stepped composite planet wheel.

2. The transmission system as claimed in claim 1 wherein the set of third planet wheels is in mesh with a set of fourth planet wheels mounted to rotate about respective planet shafts connected to the common carrier, each fourth planet wheel being in mesh with a respective third planet wheel, whereby the third sun wheel is in indirect mesh with the third planet wheels and rotates in the same direction as the third planet wheels.

3. The transmission system as claimed in claim 1 wherein the common carrier is connected to one of the input and output shafts.

4. The transmission system as claimed in claim 1 wherein the common carrier at least partially surrounds the first and second epicyclic gearsets.

5. The transmission system as claimed in claim 1 wherein the first sun wheel is connected to one of the input and output shafts.

6. The transmission system as claimed in claim 1 wherein the input and output shafts are coaxial.

7. The transmission system as claimed in claim 1 wherein the variators comprise electric motor/generators, preferable arranged coaxially.

8. The transmission system as claimed in claim 7 wherein the stator connections of the two motor/generators are connected together via one or more controllers which may be selectively operated to vary the electrical power transmitted between the two motor/generators and thus to vary the transmission ratio of the transmission system.

9. The transmission system as claimed in claim 1 further comprising:

an outer casing, which is divided into a dry space, in which the first and second variators are accommodated, and an oil lubricated space, in which the compound epicyclic gearset is accommodated.

* * * * *